United States Patent
Eschbach et al.

(10) Patent No.: US 8,687,239 B2
(45) Date of Patent: Apr. 1, 2014

(54) RELEVANCE BASED PRINT INTEGRITY VERIFICATION

(75) Inventors: Reiner Eschbach, Webster, NY (US); Michael C. Lacagnina, Penfield, NY (US); Scott Mayne, Webster, NY (US); Dennis L. Venable, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 309 days.

(21) Appl. No.: 13/160,725

(22) Filed: Jun. 15, 2011

(65) Prior Publication Data

US 2012/0320388 A1 Dec. 20, 2012

(51) Int. Cl.
*H04N 1/40* (2006.01)

(52) U.S. Cl.
USPC .......................... 358/3.26; 358/406; 358/504

(58) Field of Classification Search
USPC ........ 358/3.26, 3.29, 500, 504, 400, 406, 1.9, 358/2.1, 518, 523, 527; 382/162, 167; 345/581, 589, 591, 593–594
See application file for complete search history.

(56) References Cited

U.S. PATENT DOCUMENTS

| | | | |
|---|---|---|---|
| 6,373,975 B1 * | 4/2002 | Bula et al. | 382/144 |
| 6,980,698 B2 | 12/2005 | Eschbach et al. | |
| 7,701,625 B2 * | 4/2010 | Woolfe et al. | 358/518 |
| 7,742,200 B2 | 6/2010 | Eschbach et al. | |
| 7,898,696 B2 | 3/2011 | Marchesotti et al. | |

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

A relevance based print integrity method includes comparing current raster image data that define a document to be printed with golden raster image data that define a previous version of said document with a known (perfect) quality. A plurality of differences between said current raster image data and said golden raster image data are calculated, and each of the differences is processed to determine a relevance value of the difference and to assign the relevance value to the difference. The method includes generating and storing a list of the differences, wherein the list is ordered in terms of the relevance value assigned to each difference. The difference list is presented to a user textually or graphically and/or is used to control or interrupt printing operations.

17 Claims, 6 Drawing Sheets

RELEVANCE BASED PRINT INTEGRITY VERIFICATION

BACKGROUND

In complex printing systems, verification of print integrity is a serious problem. In the case of transaction printing, for example, a seemingly simple update to one part of the system can cause a problem in the printed output when, for example, missing resources (e.g., fonts, images, etc.) result from a change in the data path, or where font and other substitutions lead to erroneous printed output such as missing characters, misalignment of fields, and the like. These errors range from minor annoyances to critical errors, depending upon the type of document being printed.

In production printing, it is necessary to provide a quality control system to ensure that the hard copy printed output is rendered exactly as intended. This quality control can be accomplished through a strictly manual, labor-intensive process in which a human quality control inspector visually compares the printed document with a perfect original or "golden" document and notes any inconsistencies. Additionally or alternatively, automated quality control processes are implemented in which the electronic document data used to generate the printed document and/or data derived from scanning the final printed document are analyzed in an effort to verify the integrity of the data. One problem with these automated systems is that they cannot distinguish between trivial document integrity issues and critical document integrity issues, especially given that the nature of the printed document often controls this determination. As such, known automated systems typically flag an excessive amount of documents for manual inspection based upon an identified integrity issue.

Accordingly, a need has been identified for a system and method for providing a new and improved system for print integrity verification.

SUMMARY

In accordance with one aspect of the present development, a relevance based print integrity method includes comparing current raster image data that define a document to be printed with golden raster image data that define a previous version of said document with a known quality. A plurality of differences between said current raster image data and said golden raster image data are calculated, and each of the differences is processed to determine a relevance value of the difference and to assign the relevance value to the difference. The method includes generating and storing a list of the differences, wherein the list is ordered in terms of the relevance value assigned to each difference.

In accordance with another aspect of the present development, a relevance based print integrity system includes means for comparing current raster image data that define a document to be printed with golden raster image data that define a previous version of said document with a known quality. The system also includes means for calculating a plurality of differences between the current raster image data and the golden raster image data. The system also includes means for processing each of said plurality of differences to determine a relevance value of the difference and to assign said relevance value to said difference, and means for generating and storing a list of said differences, wherein said list is ordered in terms of the relevance value assigned to each difference.

DETAILED DESCRIPTION

Figure 1:
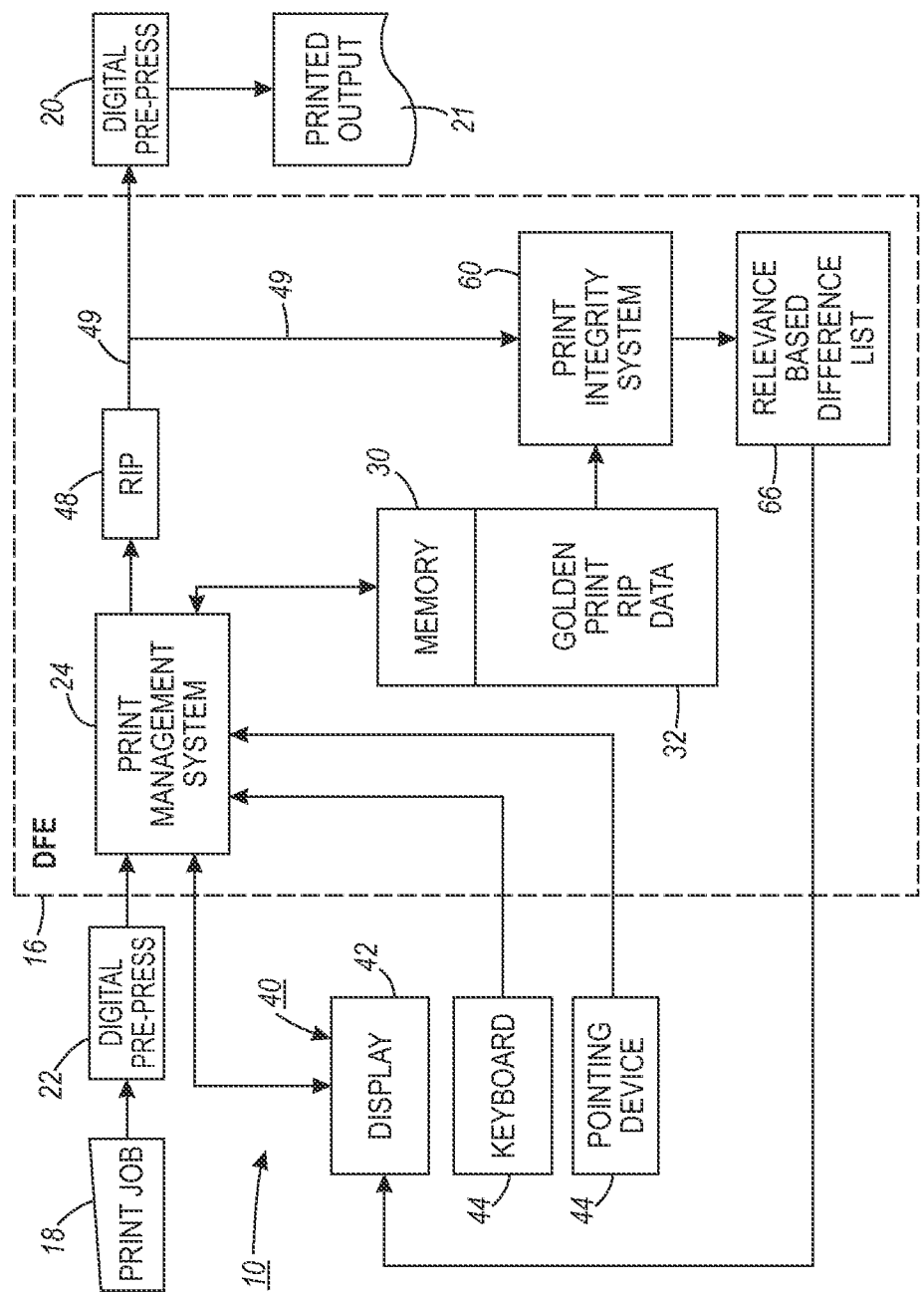
FIG. 1 provides a functional block diagram of a production printing workflow system provided with a print integrity system in accordance with the present development.

FIG. 1 provides a functional block diagram of a production printing workflow system 10 provided in accordance with the present development. As shown, the system 10 includes a computer control system which is commonly referred to in the art as a "digital front end" or "DFE" 16. The DFE receives the electronic data defining an input print job 18 which defines an input electronic document to be printed, and outputs the print job, after processing, to a printer, such as a digital printing press 20 that outputs a hardcopy print job 21 on paper or other recording media. The input print job 18 may be submitted directly to the DFE 16 or be preprocessed in an optional digital pre-press 22, e.g., at a workstation that is local or remote from the system 10 using digital image processing tools.

The DFE 16 includes a print management system 24 for performing digital image processing. The image processing performed by the print management system 24 uses software and/or hardware which execute instructions stored in associated memory 30 comprising any suitable computer readable medium such as random access memory (RAM), read only memory (ROM), magnetic disk or tape, optical disk, flash memory, holographic memory, or the like.

The print management system 24 communicates with a user interface 40, herein illustrated as an interactive graphical user interface (GUI), by which a user provides input to the print management system 24. The user interface 40 may be a part of the system 10 or may be located on a workstation remote from the system and connected through a network. The illustrated user interface 40 includes a visual display 42, such as an LCD screen, and one or more user input devices 44, such as an alphanumeric keyboard, keypad, touch screen (which can be integrated into the visual display 42), a mouse, touchpad, or other cursor control or "pointing" device 44, or combination thereof.

The DFE 16 comprises and/or is connected to a raster image processor (RIP) 48, in which an electronic document description or other data structure is transformed into binary image data that can be printed by a marking device. The print management system 24 outputs the print job, as modified, to the raster image processor (RIP) 48 of the DFE 16, which prepares the print job in a suitable format for rendering on the digital press 20 or other marking device. The image data output by the RIP 48 is sometimes referred to herein as raster image data or RIP data 49, and defines an image in terms of a bit map comprising a plurality of image pixels to be printed. Typically, the RIP 48 outputs RIP data 49 that define a respective bitmap for the pixels of each colorant of the marking device 20, e.g., a cyan bitmap, a magenta bitmap, a yellow bitmap, and a black bitmap for a CMYK printer 20.

As noted, the digital press 20 generally includes one or more color marking engines which render the print job on print media, such as paper or other suitable recording media for printing, using colorants, such as inks or toners to provide the hardcopy output 21. The marking engine can be an inkjet marking engine, xerographic marking engine, or the like. As is known in the printing arts, the press 20 may include a combination of two or more marking engines, such as a CMYK and/or a black and white print engine, and generally further includes other components, such as paper feeders, finishers, and the like.

It should be appreciated that the components of the print management system 24 may reside in a variety of locations on or in connection with the printing press being used. For example, the print management system 24 may reside in the raster image processor (RIP) 48, elsewhere in the digital front end (DFE) 16, or in an upstream software package such as a workflow management software package resident, for example, in the digital pre-press 22. The user interface 40 may also be suitably distributed throughout the workflow system 10.

A workflow system 10 provided in accordance with the present development further comprises a print integrity system 60 that receives the current RIP data 49 and implements a relevance based print integrity method or process in accordance with the present development. The print integrity system 60 is preferably initiated when the system detects a change in the configuration, either by recognizing a software and/or hardware modification or by a change being indicated by a user/operator. The print integrity system 60 compares the current RIP data 49 for rendering the current version of the input print job 18 to "golden" or known acceptable (e.g., perfect) quality print RIP data 32 saved in the memory 30 or another memory location. The golden RIP data 49 have been previously generated and stored (by another print management system or a previous version or set-up of the print management system 24), and are known to represent or define the input print job 18 with a desired quality. It is understood that the golden data will preferably also include meta-data of the print job. The meta-data comprise a higher level description of the page and can include object types, page content and variable data field content as will become clear in the following description. The print integrity system 60 generates a relevance based difference list 66 based upon the differences between the current RIP data 49 and the golden RIP data 32. The relevance based difference list 66 omits or at least deemphasizes differences that have been assigned a relevance value that is less than a select, user-adjustable threshold. The relevance based difference list 66 is textually and/or graphically output to the user interface 40 and/or is input to the print management system 24 to adjust and/or interrupt image printing operations. It should be noted that the golden RIP data 32 are not input to the digital press 20 directly for printing because the golden RIP data have not been processed by the print management system 24 and have not been formatted or otherwise processed according to user input selections or available fonts or other resources and/or to include updated variable data (e.g., times, dollar amounts, etc.) or otherwise are not suitable for being used directly in place of the current RIP data 49.

Figure 2:
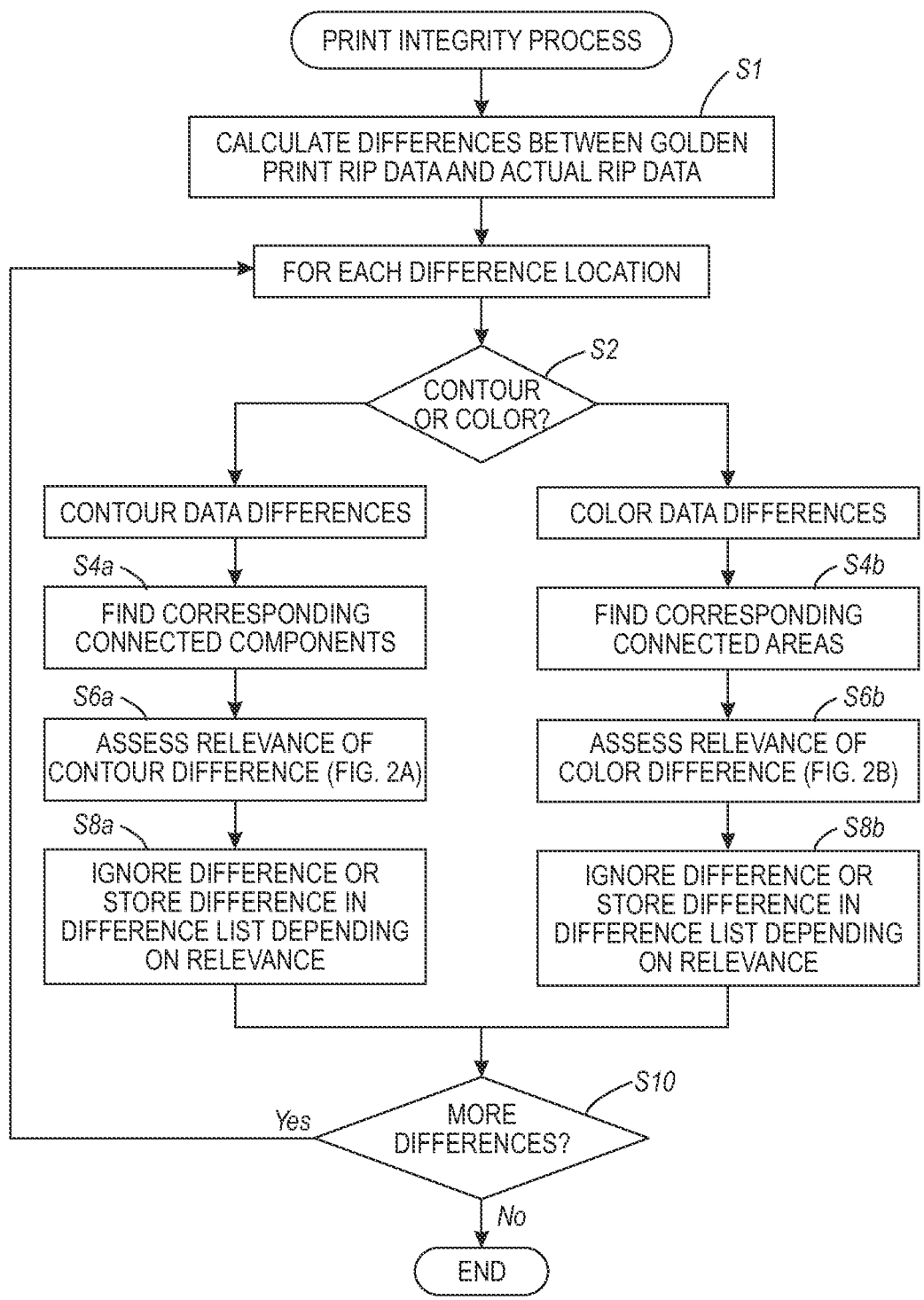
FIG. 2 is a flow chart that discloses more details of the print integrity process in accordance with an exemplary embodiment of the present development.

FIG. 2 generally illustrates operation of the print integrity system 60. The current RIP data 49 and the golden RIP data 32 are compared in a pixel-by-pixel or other manner in a step S1, and all differences between the golden print RIP data 32 and the current RIP data 49 are calculated. For each identified difference identified in step S1, a step S2 determines if the difference relates to "color data" or "contour data." "Contour data" define aspects of the input print job 18 that are content sensitive and supply information such as text, numbers, barcodes, and other information represented by alphanumeric characters or shapes. "Color data" define images such as logos, backgrounds, and the like. It is understood that this classification is a functional separation indicating, for example, that the color of a written text is less important than the shape of the text.

For each contour data difference, a step S4a finds the corresponding connected components in the current RIP data 49 and the golden RIP data 32, referred to respectively as the current connected component and the golden connected component. In other words, for the contour data difference being processed, the step S4a identifies the element or group of pixels to which the error belongs in both the golden RIP data 32 and the current RIP data 49. A connected component can be a complete alphanumeric character or can be a part or stroke of a complete alphanumeric character, i.e., the dot and the comma parts of a semicolon ";" will be separate connected components. Once the corresponding connected components are identified in both the golden RIP data 32 and the current RIP data 49, a step S6a assesses the relevance of the difference, and a step S8a ignores the difference or stores the difference in the difference list depending on the relevance determined in step S6a and depending upon user-input relevance priority parameters.

Optionally, these connected components are then further grouped into logical entities that would represent, for example, text strings. This grouping can be proximity based, but is preferably done considering the meta data associated with the golden data. In this case, the connected components that fall into a variable data entry area of the page are combined to represent that field.

Correspondingly, for each color data difference, a step S4b finds the corresponding connected areas in the current RIP data 49 and the golden RIP data 32, referred to respectively as the current connected area and the golden connected area. For the color data difference being processed, the step S4b identifies the element or group of pixels to which the error belongs in both the golden RIP data 32 and the current RIP data 49. A connected area is typically an image that includes the pixels where the difference has been identified. Once the corresponding connected areas are identified in both the golden RIP data 32 and the current RIP data 49, a step S6b assesses the relevance of the difference, and a step S8b ignores the difference or stores the difference in the difference list depending on the relevance determined in step S6b and the user-input relevance priority parameters.

The step S10 determines if more differences exist between the current RIP data 49 and the golden RIP data 32 and, if so, steps S4(a,b)-S8(a,b) are repeated until the relevance of all differences has been assessed and all differences have been processed according to step S8(a,b).

Figure 2A:
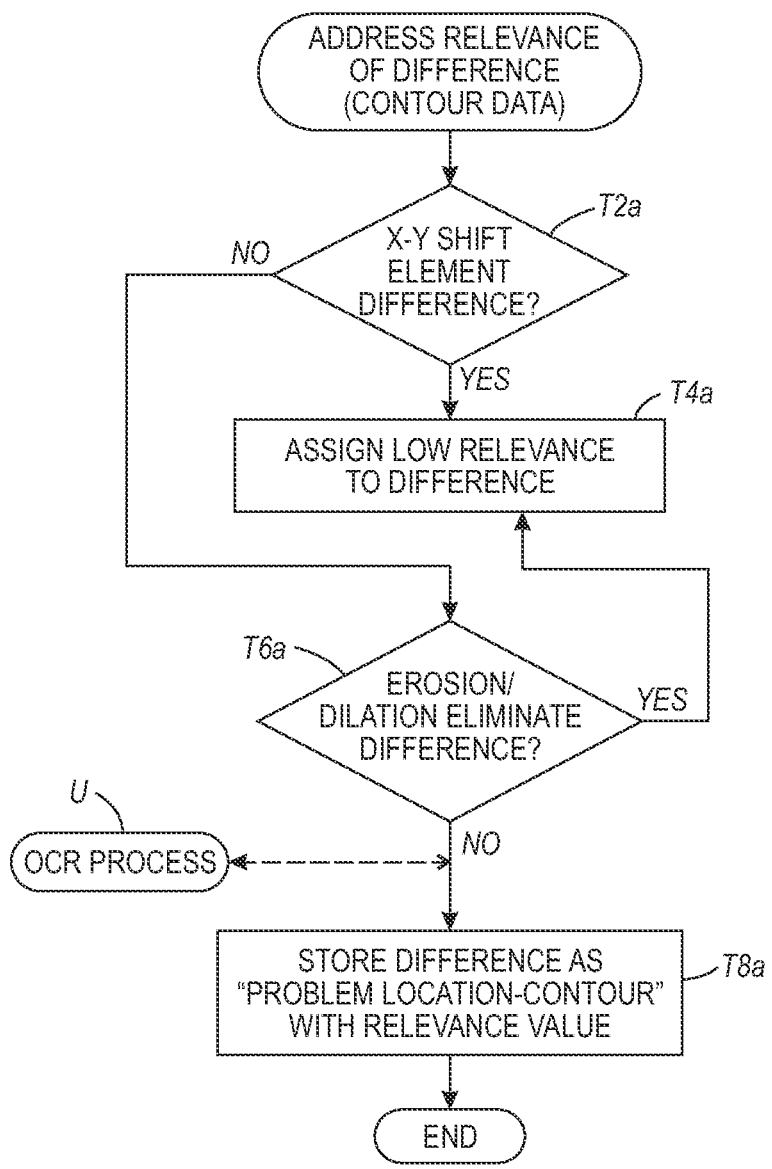
FIG. 2A is a flow chart that discloses further aspects of the step of assessing the relevance of contour data shown generally in FIG. 2.
Figure 2B:
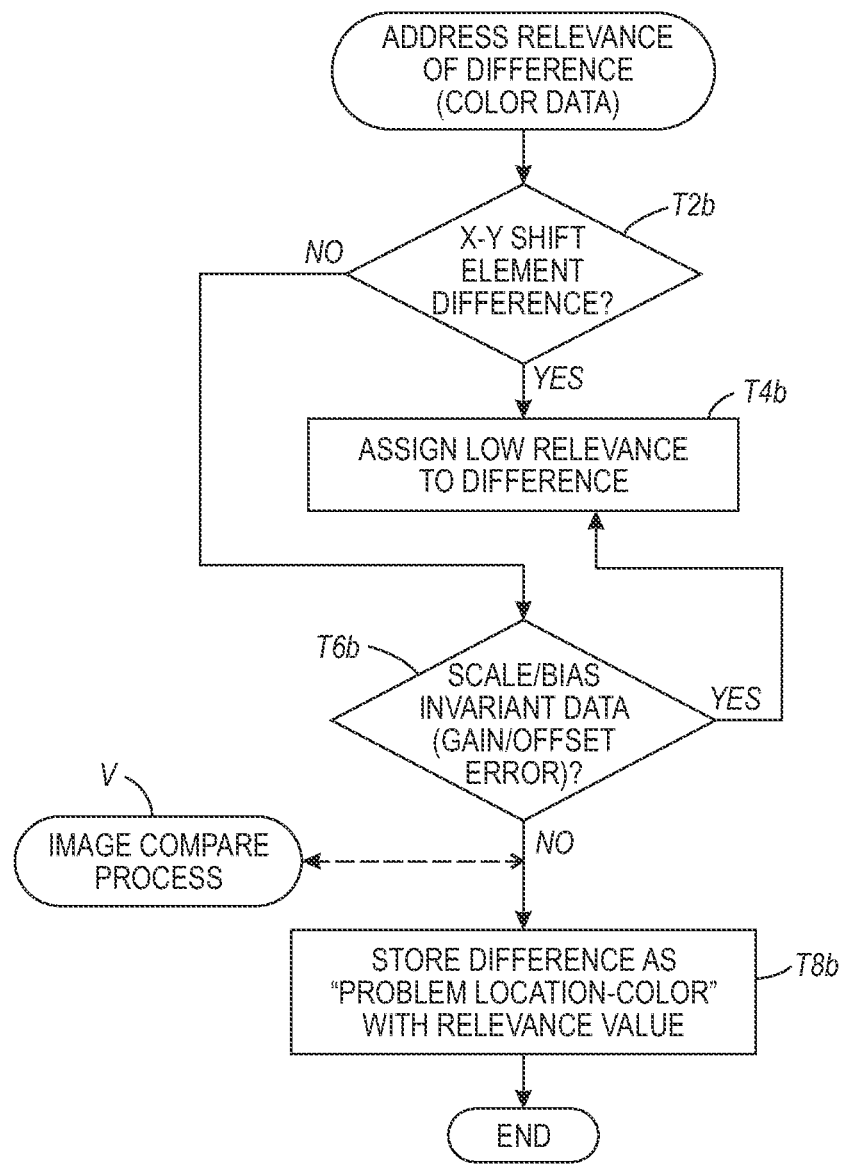
FIG. 2B is a flow chart that discloses further aspects of the step of assessing the relevance of color data shown generally in FIG. 2.

FIG. 2A discloses one embodiment of the process S6a for assessing relevance for contour data. FIG. 2B discloses one embodiment of the process S6b for assessing relevance for color data.

Referring first to FIG. 2A, the process S2b comprises a step T2a that determines if an X-Y shift (horizontal and/or vertical spatial shift) of the connected component in the current RIP data 49 will eliminate the identified difference. If so, a step T4a assigns a low relevance to the difference, because a difference that is easily corrected by shifting is deemed to be minor or trivial. Similarly, a step T6a determines if erosion or dilation of the subject connected component in the current RIP data 49 will eliminate the identified difference. As is generally known in the image processing arts, dilation in its simplest form is carried out by replacing a subject pixel with the maximum value of all the other pixels included in the neighborhood of the subject pixel, while erosion is carried out by replacing a subject pixel with the minimum value of all the other pixels included in the neighborhood of the subject pixel (e.g., a 3×3 neighborhood centered around the pixel of interest). In the general form, the processing is done via a structure element that consists of a group of pixels. If the erosion/dilation operation eliminates the difference, the step T4*a* assigns a low relevance to the difference for the same reason noted above in connection with step T2*a*. If the step T2*a* determines that the difference cannot be eliminated by an X-Y shift or if the step T6*a* determines that the difference cannot be eliminated by erosion or dilation, a step T8*a* is performed to store the difference and its location as a "Problem Location–Contour" so that the difference is flagged for further processing as set forth below. The step T8*a* also assigns a relevance value to each "Problem Location–Contour" which is based on the quantity of pixel differences or other parameters. For example, each "Problem Location–Contour" is assigned a relevance value of 1, 2, or 3 depending upon the number of pixel differences present when comparing the associated connected components. As noted in relation to FIG. 2, this process of FIG. 2A is repeated for all contour data differences between the current RIP data 49 and the golden RIP data 32.

For assessing the relevance of color data differences, as set forth in FIG. 2B, the process S6*b* comprises a step T2*b* that determines if an X-Y shift (horizontal and/or vertical spatial shift) of the connected area in the current RIP data 49 will eliminate the identified difference. If so, a step T4*b* assigns a low relevance to the difference, because a difference that is easily corrected by shifting is deemed to be minor or trivial. A step T6*b* determines if that color data difference relates to color data that are scale/bias invariant, within an allowed tolerance factor, which means that the color data of the subject connected area in the current RIP data are uniformly shifted or offset by a common gain or offset value that falls within a select, user-adjustable color shift tolerance range. If so, the step T4*b* assigns a low relevance to the difference because such a scale/bias invariant difference, within a select tolerance range, is deemed to be less relevant. It should be noted that for certain print jobs 18, the even minor differences in the color data between the actual RIP data and the golden RIP data 32 are deemed to be highly relevant, e.g., a clothing or makeup print advertisement, a food advertisement, etc., and in such cases, the tolerance range for such color shifts is set to zero or some other desired value by a user through the user interface 40. If the step T2*b* determines that the color difference cannot be eliminated by an X-Y shift or if the step T6*b* determines that the color difference is not scale/bias invariant, a step T8*b* is performed to store the difference and its location as a "Problem Location–Color" so that the color difference is flagged for further processing as set forth below. The step T8*b* also assigns a relevance value to each "Problem Location–Color" which is based on the magnitude of color differences between the connected area of the current RIP data 49 and the corresponding connected area of the golden RIP data 32. This process of FIG. 2B is repeated for all color data differences between the current RIP data 49 and the golden RIP data 32.

As noted, the T8*b* also assigns a relevance value to each "Problem Location–Color" which is based on the magnitude of color difference. It is preferred that the magnitude of color difference between a connected area of the current RIP data 49 and a corresponding connected area of the golden RIP data 32 be assessed using both a standard metric $Dif_1$ and a normalized metric $Dif_2$. In one example, the standard metric used is:

$$Dif_1 = \int\int_{x,y} [g(x,y) - d(x,y)]^2 dx\,dy$$

where g(x,y) references a color value for a pixel location (x,y) in the golden RIP data 32 and d(x,y) references a color value for a pixel location (x,y) in the current RIP data 49. Preferably the color values are expressed in a device independent color space.

One example of a normalized metric for $Dif_2$ is:

$$Dif_2 = \int\int_{x,y} \left[\frac{g(x,y) - \langle g(x,y)\rangle}{\sigma_g} - \frac{d(x,y) - \langle d(x,y)\rangle}{\sigma_d}\right]^2 dx\,dy$$

where g(x,y) references a color value for a pixel location (x,y) in the golden RIP data 32, $\langle g(x,y)\rangle$ references the average color value of the connected area in the golden RIP data 32, d(x,y) references a color value for a pixel location (x,y) in the current RIP data 49, $\langle d(x,y)\rangle$ references the average color value of the connected area in the current RIP data 49, and $\sigma_g$ and $\sigma_d$ respectively indicate the standard deviation of the color values in the connected components of the golden RIP data 32 and current RIP data 49, respectively.

It is preferred to use both the standard metric $Dif_1$ and a normalized metric $Dif_2$ by comparing them to respective user-defined thresholds $T_1, T_2, T_3$ as follows:

$Dif_1 < T_1$: color difference not relevant
$T_1 \leq Dif_1 < T_2$ AND $Dif_2 \leq T_3$: color difference not relevant
$T_2 \leq Dif_1$: color difference relevant Those of ordinary skill in the art will recognize that $Dif_1$ would flag many connected areas as having a different color, even if the color difference was insignificant for each pixel, but present it many pixels. As such, the use of $Dif_2 \leq T_3$ as set forth above eliminates such cases as being a relevant color difference if Dif2 is less than the user-defined threshold $T_3$.

It should also be noted that the connected components referenced in step S4*a* and the connected areas referenced in step S4*b* can be tagged in the golden RIP data 32 and/or can be determined by analyzing the current RIP data 32, e.g., by looking for edges, regions of color, background white space, etc.

Following the completion of the print integrity process of FIG. 2, the relevance based difference list 66 for the print job 18 is generated and comprises the list of differences between the current RIP data 49 and the golden RIP data 32, ordered by the relevance value assigned to each difference included on the list 66. As noted above, depending upon user setting, some differences can be ignored and not included on the list 66 (or be included on the list 66 with a zero or other low relevance value).

This relevance based difference list can be used in a wide variety of different operations by the print management system 24. In one embodiment, the user is presented with an image of the print job 18 on the display 40 or using a hard copy output, wherein the image of the print job includes highlighting or other visual indicia of each difference listed on the difference list 66, or each difference having a relevance value greater than a select, user-adjustable value. Alternatively or additionally, the visual indicia includes color coding, numerical values, or other means for indicating the respective relevance value of each noted difference. In another embodiment, the print management system 24 halts all document production operations if the relevance based difference list 66 includes more than a certain number of differences and/or if the difference list 66 includes one difference or a certain number of differences having more than a minimum relevance value, regardless of the overall number of differences. As noted above, a user provides input to the print management system 24 and/or to the print integrity system to determine the use of the difference list. For example, a user who requires color to be exact but who is less concerned with changes in character font and/or the exact alphanumeric characters used will input parameters that emphasize the importance of color differences, i.e., the importance of each "Problem Location–Color." Conversely, a user less concerned with color but more concerned with alphanumeric content will input parameters that emphasize the importance of differences in the contour data, i.e., the importance of each "Problem Location–Contour." Also, for certain high value or critical documents, the user will input parameters that cause more (or all) differences to be listed on the difference list 66, while for certain low value or other ordinary documents, the user input parameters will cause the print integrity system 60 to ignore or discard differences having a relevance that is below a select minimum threshold such that only differences above a minimum relevance are included on the difference list 66.

Figure 3:
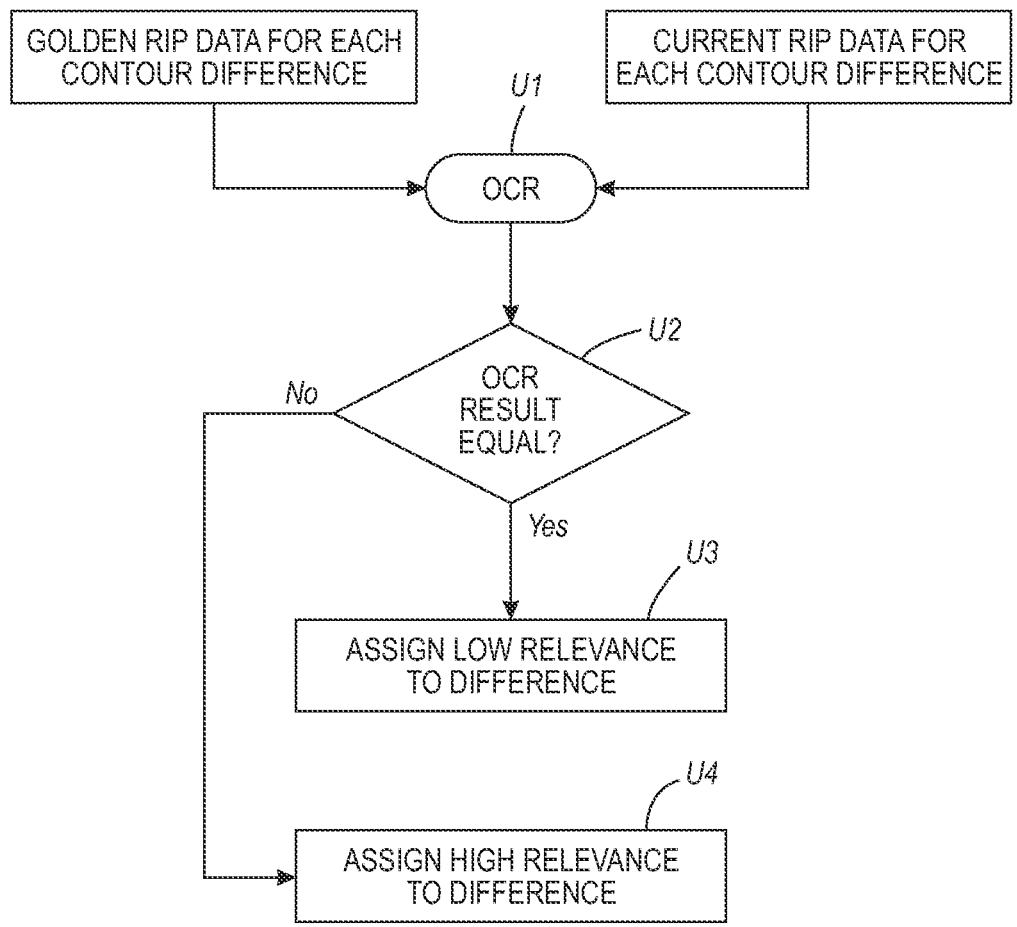
FIG. 3 illustrates an OCR process for further assessing the relevance of contour data differences.

FIG. 2A shows that each contour data difference is optionally subjected to an OCR (optical character recognition) process U as part of the process of assessing its relevance. The OCR process is shown in FIG. 3, where it can be seen that the current RIP data 49 and the golden RIP data for the connected components of a contour data difference are each input to an OCR process or engine in a step U1. A step U2 determines if the OCR result for the golden RIP data 32 equals the OCR result for the current RIP data, i.e., if the current connected component and the golden connected component represent the same alphanumeric character. If so, a step U3 assigns a low relevance value to the difference, because the OCR process U1 indicates that the same information is present. If the step U2 determines that the OCR result for the golden RIP data 32 does not equal the OCR result for the current RIP data 49, a step U4 assigns a high relevance value to the difference, because the OCR process U1 indicates that the same information is not found in the current RIP data and the golden RIP data at the location of the difference. This step will eliminate differences that are caused by changes in e.g.: font size or by changes in font face or the like. Also, it is understood that OCR here is used to also include barcode decoders if the optionally associated meta data indicates that the page area contained such information.

The OCR step described above is optionally further divided into a set of OCR steps, each being performed by a different OCR. The output of multiple OCR engines can then be used to derive a 'readability' metric of the text. For example, if golden RIP data 32 are OCR'ed (i.e., identified) correctly by four of five OCR engines and the new version of the page defined by the current RIP data 49 is correctly OCR'ed by five out of five OCR engines, the present print integrity system 60 will determine better readability of the text in the current RIP data 49 and thus will assign a low importance/relevance to the differences between the associated golden RIP data 32 and current RIP data. If, in contrast, only three out of the five OCR engines correctly identify the text in the current RIP data 49, a lower readability and thus—dependent on application—a higher problem relevance can be derived by the print integrity system 60.

Figure 4:
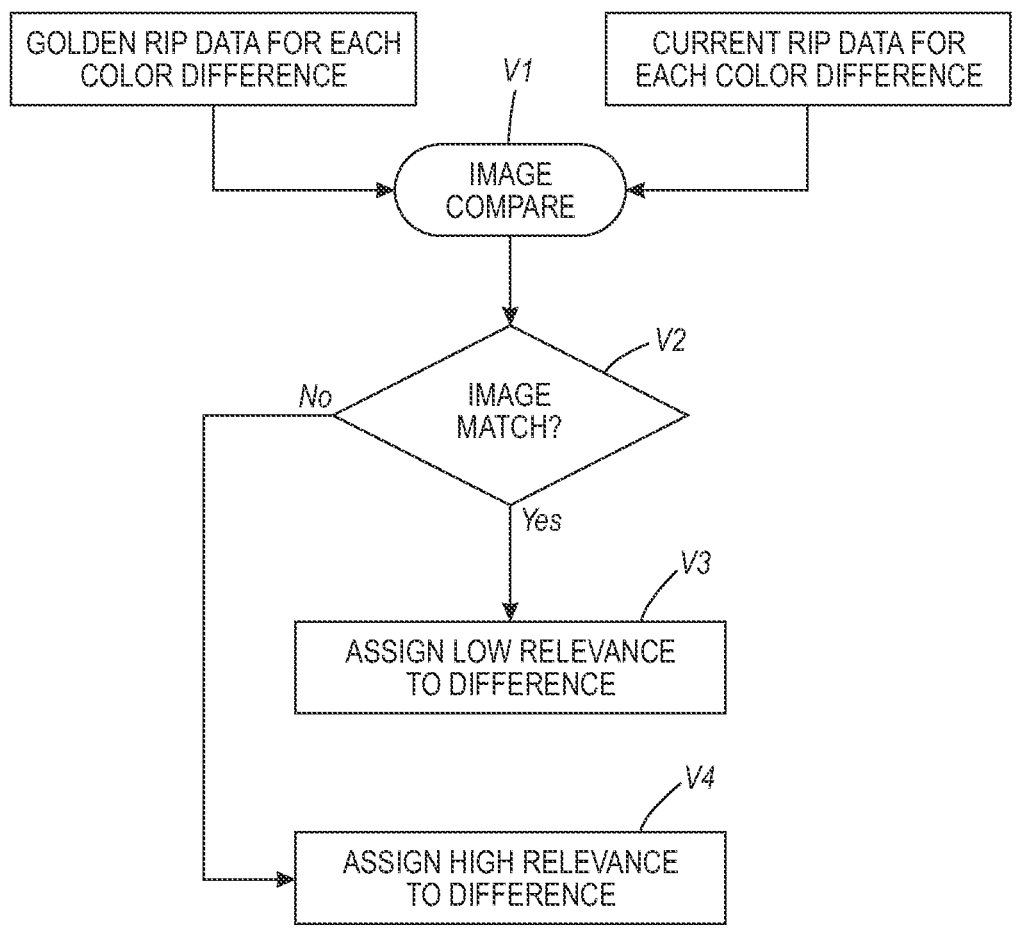
FIG. 4 illustrates an image compare process for further assessing the relevance of color data differences.

Similarly, FIG. 2B shows that each color data difference is optionally subjected to an image compare process V as part of the process of assessing its relevance. The image compare process is shown in FIG. 4, where it can be seen that the current RIP data 49 and the golden RIP data for the connected areas of the color data difference are each input to an image compare process/engine in a step V1. A step V2 determines if the connected area for the golden RIP data 32 is the same image as the connected area for the current RIP data. If so, a step V3 assigns a low relevance value to the difference, because the image compare engine V1 indicates that the connected areas define matching images within acceptable tolerances. If the step V2 determines that the connected areas do not define matching images, a step V4 assigns a high relevance value to the color difference. In one embodiment, the Image Compare process V1 comprises a process as set forth in U.S. Pat. No. 6,980,698 issued to Eschbach & Fan and entitled "Image Finder Method and Apparatus for Pixography and Other Photo-Related Reproduction Applications," the entire disclosure of which is hereby incorporated by reference into the present specification.

The claims, as originally presented and as they may be amended, are intended to encompass variations, alternatives, modifications, improvements, equivalents, and substantial equivalents of the embodiments and teachings disclosed herein.

The invention claimed is:

1. A relevance based print integrity method comprising:
comparing current raster image data that define a document to be printed with golden raster image data that define a previous version of said document with a known quality;
calculating a plurality of differences between said current raster image data and said golden raster image data;
processing each of said plurality of differences to determine a relevance value of the difference and to assign said relevance value to said difference;
generating and storing a list of said differences, wherein said list is ordered in terms of the relevance value assigned to each difference, wherein differences having a relevance value that is less than a select threshold are not included in said list of differences;
classifying each of said differences as either:
(i) a contour difference that relates to alphanumeric characters; or,
(ii) a color difference that relates to the color of an image;
said relevance based print integrity method further comprising outputting said list of differences to a user by at least one of:
using a printer to print the list of differences on paper;
using a video display to output the list of differences in textual or graphical format.

2. The print integrity method as set forth in claim 1, wherein said step of processing each of said plurality of differences to determine said relevance value comprises:
a first relevance assessment process for each of said differences that is classified as a contour difference; and
a second relevance assessment process that is different from said first relevance assessment process for each of said differences that is classified as a color difference.

3. The print integrity method as set forth in claim 2, further comprising:
for each of said contour differences, identifying a current connected component in said current raster image data and a golden connected component in said golden raster image data, wherein said current and golden connected components respectively define corresponding characters in said current and golden raster image data for which said contour difference has been identified.

4. The print integrity method as set forth in claim 3, wherein said step of assessing the relevance of said contour difference comprises:
  determining whether said contour difference is eliminated by a spatial shift of said current connected component relative to said golden connected component; and,
  assigning a low relevance to said contour difference if said contour difference is eliminated by said spatial shift.

5. The print integrity method as set forth in claim 4, wherein said step of assessing the relevance of said contour difference further comprises:
  determining whether said contour difference is eliminated by an erosion or dilation of said current connected component relative to said golden connected component; and,
  assigning said low relevance to said contour difference if said contour difference is eliminated by said erosion or dilation.

6. The print integrity method as set forth in claim 5, further comprising:
  inputting said current raster image data defining said current connected component to at least one optical character recognition (OCR) engine; and
  assigning said low relevance to said contour difference if at least one of the following conditions occurs:
    (i) said at least one OCR engine determines that said current connected component and said golden connected component represent the same alphanumeric character;
    (ii) said current connected component has a readability metric that is higher than a corresponding readability metric of said golden connected component.

7. The print integrity method as set forth in claim 6, further comprising storing said contour difference and a relevance value for said contour difference as a "Problem Location–Contour" if said contour difference is assigned other than said low relevance.

8. The print integrity method as set forth in claim 7, further comprising:
  for each of said color differences, identifying a current connected area in said current raster image data and a golden connected area in said golden raster image data, wherein said current and golden connected areas respectively define corresponding images in said current and golden raster image data for which said color difference has been identified.

9. The print integrity method as set forth in claim 8, wherein said step of assessing the relevance of said color difference comprises:
  determining whether said color difference is eliminated by a spatial shift of said current connected area relative to said golden connected area; and,
  assigning said low relevance to said color difference if said color difference is eliminated by said spatial shift.

10. The print integrity method as set forth in claim 9, wherein said step of assessing the relevance of said color difference further comprises:
  determining whether said color difference is defined by scale/bias invariant data; and,
  assigning a low relevance to said color difference if said color difference is defined by scale/bias invariant data.

11. The print integrity method as set forth in claim 10, further comprising:
  inputting said current raster image data defining said current connected area and said golden raster image data defining said golden connected area to an image compare engine; and
  assigning said low relevance to said color difference if said image compare engine determines that said current connected area and said golden connected area represent the same image.

12. The print integrity method as set forth in claim 11, further comprising storing said color difference and a relevance value for said color difference as a "Problem Location –Color" if said color difference is assigned other than said low relevance.

13. The print integrity method as set forth in claim 12, wherein said second relevance assessment process for each of said color differences comprises:
  using both a standard metric $Dif_1$ and a normalized metric $Dif_2$, wherein:

$$Dif_1 = \iint\limits_{x,y} [g(x,y) - d(x,y)]^2 \, dx\, dy$$

where g(x,y) references a color value for a pixel location (x,y) in the golden RIP data 32 and d(x,y) references a color value for a pixel location (x,y) in the current RIP data 49; and, $$Dif_2 = \iint\limits_{x,y} \left[\frac{g(x,y) - \langle g(x,y)\rangle}{\sigma_g} - \frac{d(x,y) - \langle d(x,y)\rangle}{\sigma_d}\right]^2 dx\, dy$$

where g(x,y) references a color value for a pixel location (x,y) in the golden RIP data 32, <g(x,y)> references the average color value of the connected area in the golden RIP data 32, d(x,y) references a color value for a pixel location (x,y) in the current RIP data 49, <d(x,y)> references the average color value of the connected area in the current RIP data 49, and $\sigma_g$ and $\sigma_d$ respectively indicate a standard deviation of the color values in the connected components of the golden RIP data 32 and current RIP data 49, respectively.

14. The print integrity method as set forth in claim 13, wherein said second relevance assessment process for each of said color differences further comprises comparing the standard metric $Dif_1$ and the normalized metric $Dif_2$ to thresholds $T_1, T_2, T_3$ as follows:
  assigning said low relevance to said color difference if $Dif_1 < T_1$;
  assigning said low relevance to said color difference if $T_1 \leq Dif_1 < T_2$ AND $Dif_2 \leq T_3$;
  assigning a high relevance to said color difference if $T_2 \leq Dif_1$.

15. The print integrity method as set forth in claim 12, further comprising
  interrupting a printing system based upon said list of differences.

16. A relevance based print integrity system comprising:
  means for comparing current raster image data that define a document to be printed with golden raster image data that define a previous version of said document with a known quality;
  means for calculating a plurality of differences between said current raster image data and said golden raster image data;

means for processing each of said plurality of differences to determine a relevance value of the difference and to assign said relevance value to said difference;

means for generating and storing a list of said differences, wherein said list is ordered in terms of the relevance value assigned to each difference;

means for classifying each of said differences as either:

(i) a contour difference that relates to alphanumeric characters; or, (ii) a color difference that relates to the color of an image.

17. The print integrity system as set forth in claim 16, wherein said means for processing each of said plurality of differences to determine said relevance value comprises:

means for performing a first relevance assessment process for each of said differences that is classified as a contour difference; and means for performing a second relevance assessment process that is different from said first relevance assessment process for each of said differences that is classified as a color difference.

* * * * *